Dec. 30, 1924.
S. G. DOWN
BRAKE SHOE CONSTRUCTION
Filed Dec. 15, 1923
1,520,701
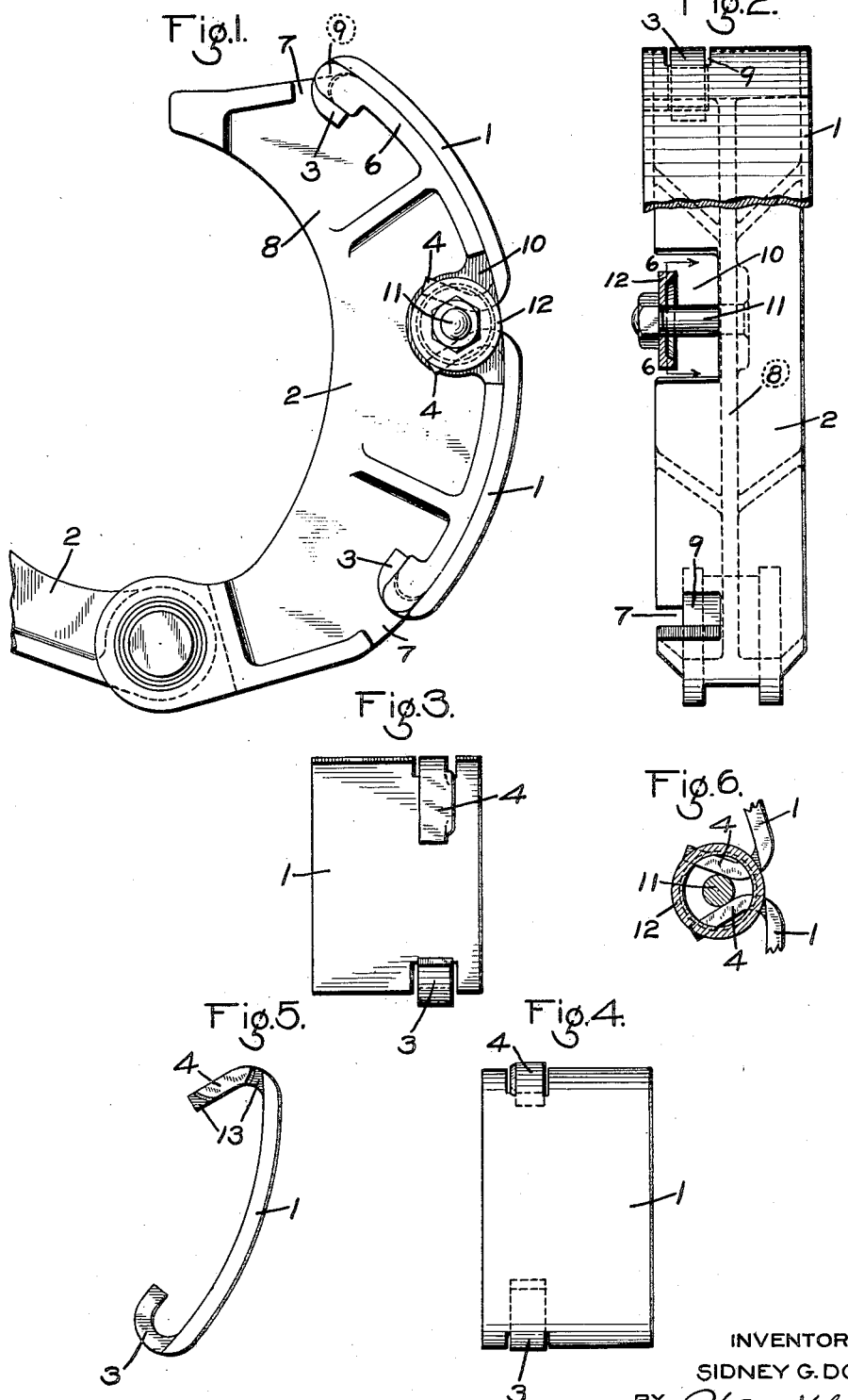
INVENTOR
SIDNEY G. DOWN
BY Wm. M. Cady
ATTORNEY Patented Dec. 30, 1924.

1,520,701

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-SHOE CONSTRUCTION.

Application filed December 15, 1923. Serial No. 680,961.

*To all whom it may concern:*

Be it known that I, SIDNEY G. DOWN, a citizen of the United States, residing at Pittsburgh, in the county of Allegheny and State of Pennsylvania, have invented new and useful Improvements in Brake-Shoe Constructions, of which the following is a specification.

This invention relates to brake shoes, and more particularly to a brake shoe construction adapted for the internal expanding drum type of brake, such as employed on motor vehicles.

The principal object of my invention is to provide an improved brake shoe construction of the above character.

In the accompanying drawing; Fig. 1 is a side elevation of a brake head, showing my improved brake shoe construction applied thereto; Fig. 2 an end elevation of the construction shown in Fig. 1; Fig. 3 an inverted plan view of one of the brake shoes; Fig. 4 a plan view of one of the brake shoes; Fig. 5 a side view of one of the brake shoes; and Fig. 6 a detail view of the central shoe fastening means, the clamping washer being sectioned on line 6—6 of Fig. 2.

According to my invention, two brake shoes each indicated by the reference numeral 1 are applied to the arcuate receiving face of the brake head 2. Each brake shoe is provided at one end with a lug 3 which is formed as an integral part of the shoe and is bent inwardly to form a hook, as clearly shown in Fig. 5. The other end of the brake shoe is also provided with an integral lug 4 which is bent inwardly.

At each end of the arcuate face, the brake head peripheral web 6 is provided with a side notch 7 at one side of the central web 8 and also a longitudinal notch 9 opening into the notch 7, so that the hook lug 3 may be applied in the notch 7 and then hooked into the notch 9, to thereby hold the brake shoe against longitudinal movement and also against lateral movement with respect to the brake head.

At the central portion, the web 6 is provided with a notch 10 for receiving the lugs 4 of the two brake shoes 1. A bolt 11 is secured through the web 8 centrally of the notch 10 and when the two brake shoes are positioned on the brake head, a clamping washer 12 is applied to the bolt, said washer having an annular flange adapted to engage milled out notches 13 in the bent end 4 of the brake shoe.

By employing only one rigid fastening at the center, the shoes are enabled to freely expand and contract under changes in temperature. The construction is also such that application and removal of brake shoes may be easily and quickly effected.

Having now described my invention, what I claim as new and desire to secure by Letters Patent, is:—

1. The combination with a brake head having an arcuate face, of two brake shoes applied to said arcuate face, each having a hooked lug at one end engaging a portion of the brake head, a common washer engaging the other ends of said brake shoes, and means for clamping said washer against said brake shoe ends.

2. The combination with a brake head having an arcuate face, of two brake shoes applied to said arcuate face, each having a hooked lug at one end engaging the outer end portions of said brake head, a bolt secured to said brake head intermediate its ends, and a single washer applied to said bolt and engaging the other ends of said brake shoes for clamping the brake shoes to the brake head.

3. The combination with a brake head having an arcuate face, of two brake shoes applied to said arcuate face, each having a hooked lug at one end engaging the outer end portions of said brake head, a bolt secured to said brake head intermediate its ends, and a washer applied to said bolt and engaging inwardly turned lugs provided at the opposite ends of said brake shoes.

In testimony whereof I have hereunto set my hand.

SIDNEY G. DOWN.